(12) United States Patent
Gigliotti et al.

(10) Patent No.: US 6,393,458 B1
(45) Date of Patent: May 21, 2002

(54) METHOD AND APPARATUS FOR LOAD BALANCING IN A DISTRIBUTED OBJECT ARCHITECTURE

(75) Inventors: Samuel S. Gigliotti, Alpharetta; Ward L. Boole, Marietta, both of GA (US)

(73) Assignee: Genrad, Inc., Westford, MA (US)

( * ) Notice: Subject to any disclaimer, the term of this patent is extended or adjusted under 35 U.S.C. 154(b) by 0 days.

(21) Appl. No.: 09/289,173

(22) Filed: Apr. 9, 1999

Related U.S. Application Data

(60) Provisional application No. 60/117,840, filed on Jan. 28, 1999.

(51) Int. Cl.[7] ........................... G06F 15/16; G06F 13/14
(52) U.S. Cl. ..................... 709/203; 709/201; 709/202; 709/227; 709/238; 709/105; 709/318; 707/10; 707/104
(58) Field of Search ................................. 709/201–203, 709/205, 217–221, 223–224, 227–228, 238, 250, 101–102, 104–105, 313–318; 707/10, 103–104

(56) References Cited

U.S. PATENT DOCUMENTS

| | | | | |
|---|---|---|---|---|
| 5,603,029 A | * | 2/1997 | Aman et al. ................. | 709/105 |
| 5,790,789 A | * | 8/1998 | Suarez ........................ | 709/202 |
| 5,794,005 A | * | 8/1998 | Steinman ..................... | 709/315 |
| 5,847,957 A | * | 12/1998 | Cohen et al. ................ | 709/203 |
| 5,870,605 A | * | 2/1999 | Bracho et al. ............... | 709/318 |
| 5,881,315 A | * | 3/1999 | Cohen ......................... | 709/202 |
| 5,898,870 A | * | 4/1999 | Okuda et al. ................ | 709/104 |
| 5,958,012 A | * | 9/1999 | Battat et al. ................. | 709/224 |
| 5,970,503 A | * | 10/1999 | Eisenberg .................... | 707/203 |
| 6,138,143 A | * | 10/2000 | Gigliotti et al. ............. | 709/203 |
| 6,167,427 A | * | 12/2000 | Rabinovich et al. ......... | 709/201 |

* cited by examiner

*Primary Examiner*—Bharat Barot
(74) *Attorney, Agent, or Firm*—Nutter, McClennen & Fish LLP

(57) ABSTRACT

A load balancing system for use in a distributed computing environment. An event publish and subscribe model implements the load balancing system. In the system, at least one client object publishes an event for response by a number of server hosts. A load balancing object monitors the load to the server hosts to determine a balanced distribution for the event.

16 Claims, 5 Drawing Sheets

METHOD AND APPARATUS FOR LOAD BALANCING IN A DISTRIBUTED OBJECT ARCHITECTURE

CROSS REFERENCE TO RELATED APPLICATIONS

This application claims the benefit of U.S. Provisional Application No. 60/117,840 filed Jan. 28, 1999.

STATEMENT REGARDING FEDERALLY SPONSORED RESEARCH

Not Applicable

FIELD OF THE INVENTION

The present invention relates to load balancing and more specifically, to static and dynamic load balancing within a distributed object architecture.

BACKGROUND OF THE INVENTION

Sophisticated financial transaction, manufacturing and data processing systems are increasingly being implemented in computerized modern installations. In a typical large installation, hundreds and sometimes thousands of machines, transaction types, objects or nodes may be defined in a distributed computing environment or infrastructure.

A simplified typical distributed object computing environment 10 is illustrated in FIG. 1. The distributed object computing environment 10 includes a plurality of machines 12. Machines 12 may be actual computers, such as work stations or PCs commonly known in the art or any other computers useful as either server or client machines, special purpose machines, or virtual machines. As used herein, the term "host" generally refers to an actual computer that may be executing a plurality of virtual machines, processes or threads. In the context of a manufacturing execution system, special purpose machines might include bar code software devices that operate on a computer, but appear to software that runs on and interacts with the virtual machine to be a complete computer. A common example of a virtual machine known in the art is the Java virtual machine, however, other types of virtual machines are available and may be used herein.

It is common that in these large modern installations that only a portion of the machines, nodes and/or objects in the network may be used at any one time. Thus, a common problem with these complicated infrastructures is the potential for overload or bottlenecking at any one node or object and the resultant inability of that node or object to accept or process further transactions or events. This condition can occur if, for example, the node experiences unusually high transaction activity due to an unexpected event. In such systems it is vital that processing in the system occur with maximum efficiency while still affording maximum flexibility for future expansion and modification. In order to achieve this efficiency and prevent overloading, load balancing must be undertaken within the system.

Basically, load balancing is the reallocation and reapportionment of resources within a system to achieve a uniform or balanced distribution of work or load within the system. Load balancing can be generally classified as either static or dynamic. In static load balancing, the required events or processes occur regardless or independent of the current system loads or state. Commonly, static load balancers are manually implemented by a system operator who observes how work is apportioned among the nodes in a system and based on these observations, and re-apportions the work to even out the load. Static load balancing is relatively uncomplicated to implement but poses problems in operation because static load balancing disregards changes and fluctuations in the current system state. Essentially, when the system is in operation, the balancing is fixed and thus the system cannot respond to unusual circumstances or changes in the system's usage patterns. If changes or modifications are required, operator intervention is required to incorporate any changes in the system.

In dynamic load balancing, the status and conditions of all nodes or members of the system are accounted for on a routine basis in order to decide where to process events or tasks based on the current usage in the system. However, dynamic load balancing is inherently more complicated and requires significantly more computing power than static load balancing since it requires constant maintenance of the states in the system.

Further, modern requirements demand that any load balancing system be scalable. Scalability provides a system a way to limit the degradation of system response time as new members, nodes or objects are added, removed or modified within the existing infrastructure.

Referring to FIG. 2, a prior art load balancing system 20 for distributing requests from client objects to server objects is shown. The load balancing system generally is divided into a client side 22 and a server side 24. The client side 22 may include a number of client or calling objects 26, 28 and 30. These client objects interact with a single load balancer object 32 on the server side 24. The load balancer 32 then communicates with a number of server or receiving objects 34, 36 and 38. In the prior art, the single load balancer object 32 is subject to bottlenecking since all events are passed through this single load balancer. In operation, the load balancer object 32 will redirect incoming events or calls from the client objects to specific server objects. Essentially, the load balancer 32 will determine which specific server object should receive the event and then direct that event to that specific server object. The receiving server object will then process the event or call which was received. Such a system is both inefficient and cumbersome because it implements two objects, the load balancer and server object, which have the same interface which results in maintenance and operating problems involved with the duplicative code. Furthermore, since the load balancer is implemented on the server side, the potential for overloading the server is increased.

Accordingly, it would be desirable to have load balancing which incorporates the benefits of both static and dynamic load balancing and is infinitely scalable in an object oriented environment.

SUMMARY OF THE INVENTION

The invention provides a method, system and computer program product for load balancing in a distributed computing environment. The system for balancing the distribution of event messages in a distributed object computing environment includes at least one client publishing an event containing information and a plurality of server classes residing on one or more server hosts, at least one server class subscribing to the event published by the client, and a plurality of load balancers. Each load balancer queries the server hosts to calculate a load parameter for each server host.

The system provides for the registering of a plurality of server classes as subscribers for selected events. For each subscribing server class, the system also provides for the registering of one or more server hosts as capable of running an instance of the class. The client then publishes an event which is received by only one of the plurality of load balancers.

The system then provides for the selection of a server host for each subscribing server class registered to subscribe to the event by the load balancer based on load parameters calculated and the registration of hosts capable of running an instance of the subscribing server classes. The selected server host identity for each subscribing server class is then coupled to the event for further publication of the event into the distributed object computing environment by the load balancer. The event is then received by a plurality of event subscribers, each event subscriber reviewing the server host identity information for a server host affiliated with that event subscribers. The event subscribers pass the event on to the identified subscribing class for each class identified for processing on a server host affiliated with the event subscriber. At least one instance of each subscribing class for the published event then performs logical operations in accordance with the event.

In another embodiment, each server host may also be assigned a certain power rating. The load balancing object then takes the current load of the server host and divides the load by the power rating to determine a relative load.

DETAILED DESCRIPTION OF THE INVENTION

The present invention provides a load balancing system for use in a distributed computing environment, and in particular, a distributed object computing environment.

Figure 1:
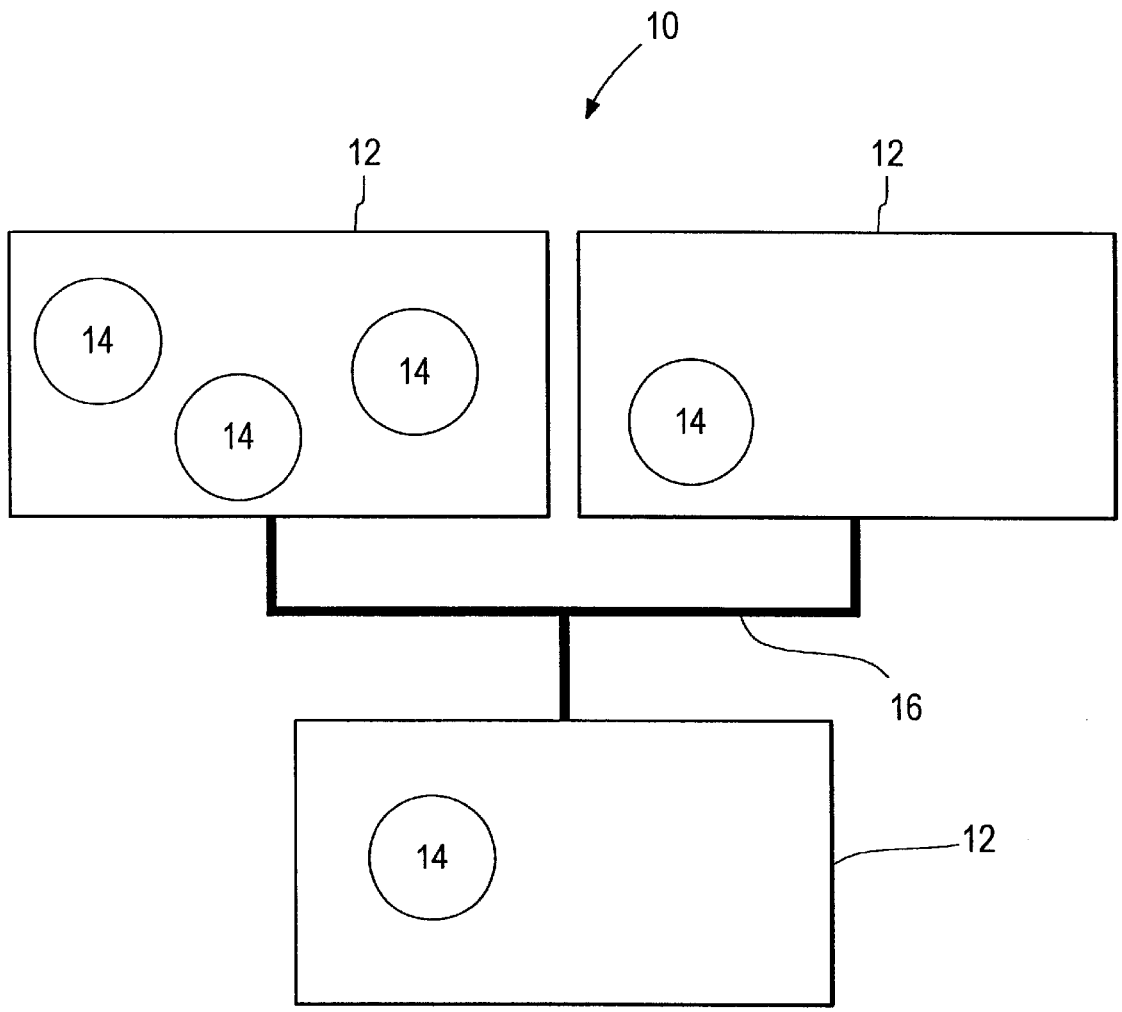
FIG. 1 is a block diagram of a prior art distributed computing environment.
Figure 2:
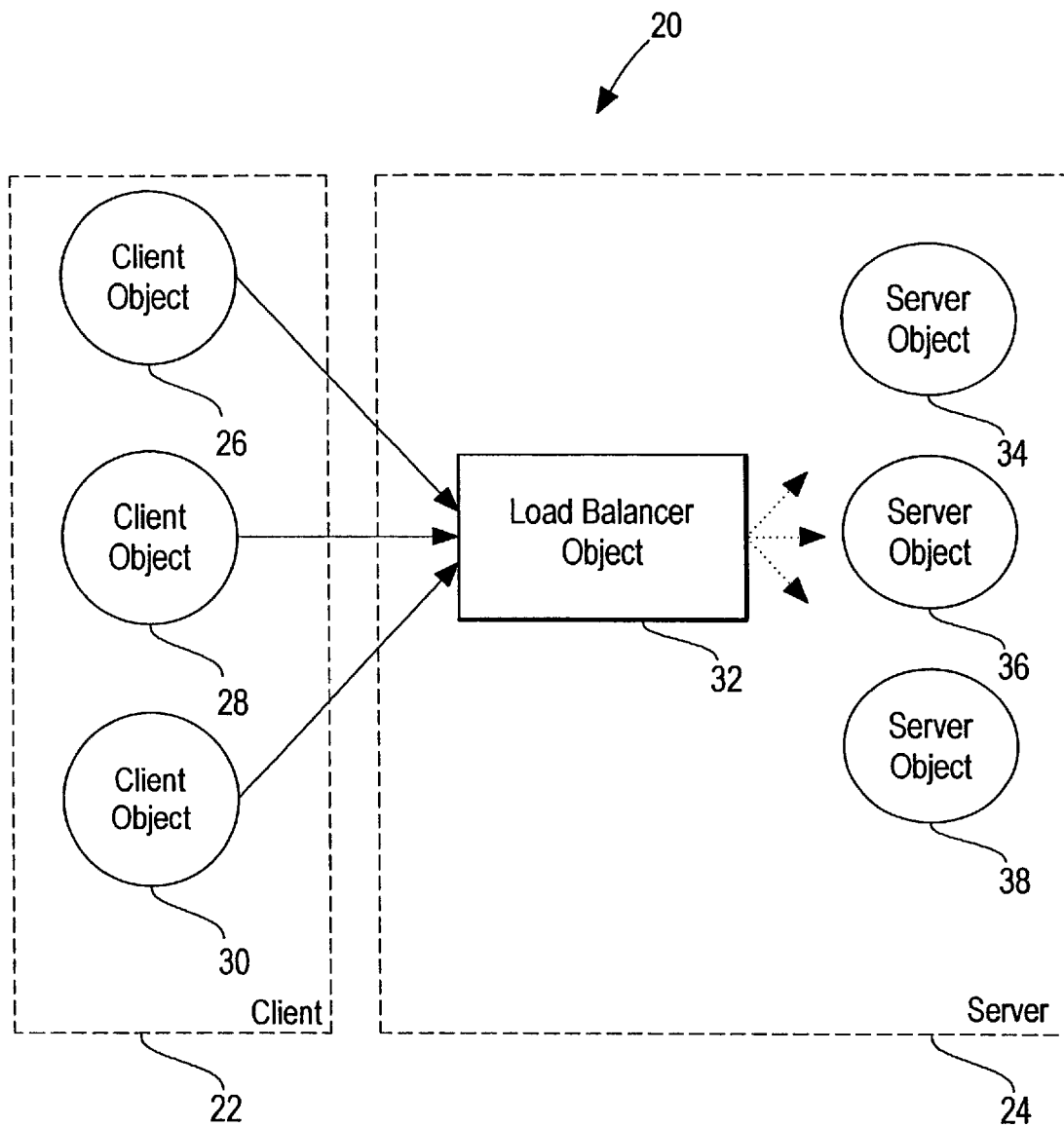
FIG. 2 is a block diagram of a prior art load balancing system.

As used herein, software objects 14 may run on machines 12 as shown in FIG. 1. Objects 14 may be created using any object-oriented software programming language known in the art such as C++, Java, Objective C, SmallTalk or others. Additionally, a number of visual and textual software development tools exist to help developers to define and create objects 14.

Machines 12 in the distributed object computing environment connect to each other using a communications network 16. While a variety of communications networks are known in the art, a particularly advantageous communications network for use with the invention is an Object Request Broker ("ORB"). An ORB is middleware that manages communications and data exchanges between objects, even when those objects are on different machines. The primary functions of an ORB include defining interfaces between objects, locating and activating remote objects, and communications between clients and objects. The goal of an ORB is to make it appear as if an object 14 is local to a machine, while in fact the object 14 may reside in a different process or machine 12.

A variety of ORB standards are available for software development including COM/DCOM by Microsoft, the Common Object Request Broker Architecture ("CORBA") organized by the Object Management Group ("OMG"), and the Remote Method Invocation ("RMI") extensions to the Java language/virtual machine. Commercially available CORBA compliant ORBs presently include ORBIX by IONA Technology, VisiBroker by Inprise, PowerBroker by Expersoft, SmallTalkBroker by DNS Technologies, Object Director by Fujitsu, DSOM by IBM, DAIS by ICL, SORBET by Siemens Nixdorf, and NonStop DOM by Tandem. RMI, which allows Java objects to be executed remotely, provides ORB-like capabilities as a native extension of Java.

Communications network 16 may also include a publish-subscribe event protocol. In publish-subscribe communications, objects may publish information or requests of interest and other objects may subscribe to a selected subset of published material or events. As used herein, an event typically includes certain data, commands, target information and certain references such as information about the publisher of the event. Publish-subscribe or event-driven communications provide asynchronous communication among objects, that is, a publishing object need not wait for, or even know about, subscribing objects in order to publish. As an example of one possible publish-subscribe protocol, OMG has developed a standardized specification for event-based publish-subscribe communications and CORBA now includes a "CORBA Event Service" specification that includes a "CORBA Event Channel."

As used herein, a client object may be an ORB compliant object (such as a CORBA object) and have an associated Graphical User Interface ("GUI") to allow a system user to interact with the software to cause the client object to initiate an event. Alternatively, a client object may represent a client, for example a dedicated device, such as a bar code scanner, having an embedded processor or being connected to a general purpose computer that may be programmed with an object wrapper. For example, all CORBA objects are defined using Interface Definition Language (IDL). IDL is an object-oriented interface definition formalism that completely defines the interface between objects. Using IDL, a client may be made to appear to the system as a CORBA object, regardless of the client's location or implementation.

Zero or more server objects in the system can be responsive to the event published by the client object. Typically, one or more server objects are responsive to an event, however, for some events and under some circumstances, it may be that there are no responsive server objects and the publish-subscribe transaction may include only the publishing object as a participant. In a manufacturing execution system, a responsive server object may include, for example, an object that updates work-in-process data to account for work items removed from their ordinary work flow because they are defective. Such an object would "listen" for or subscribe to events relating to defective work items and could perform some logic, which might include publishing events of its own.

Figure 4:
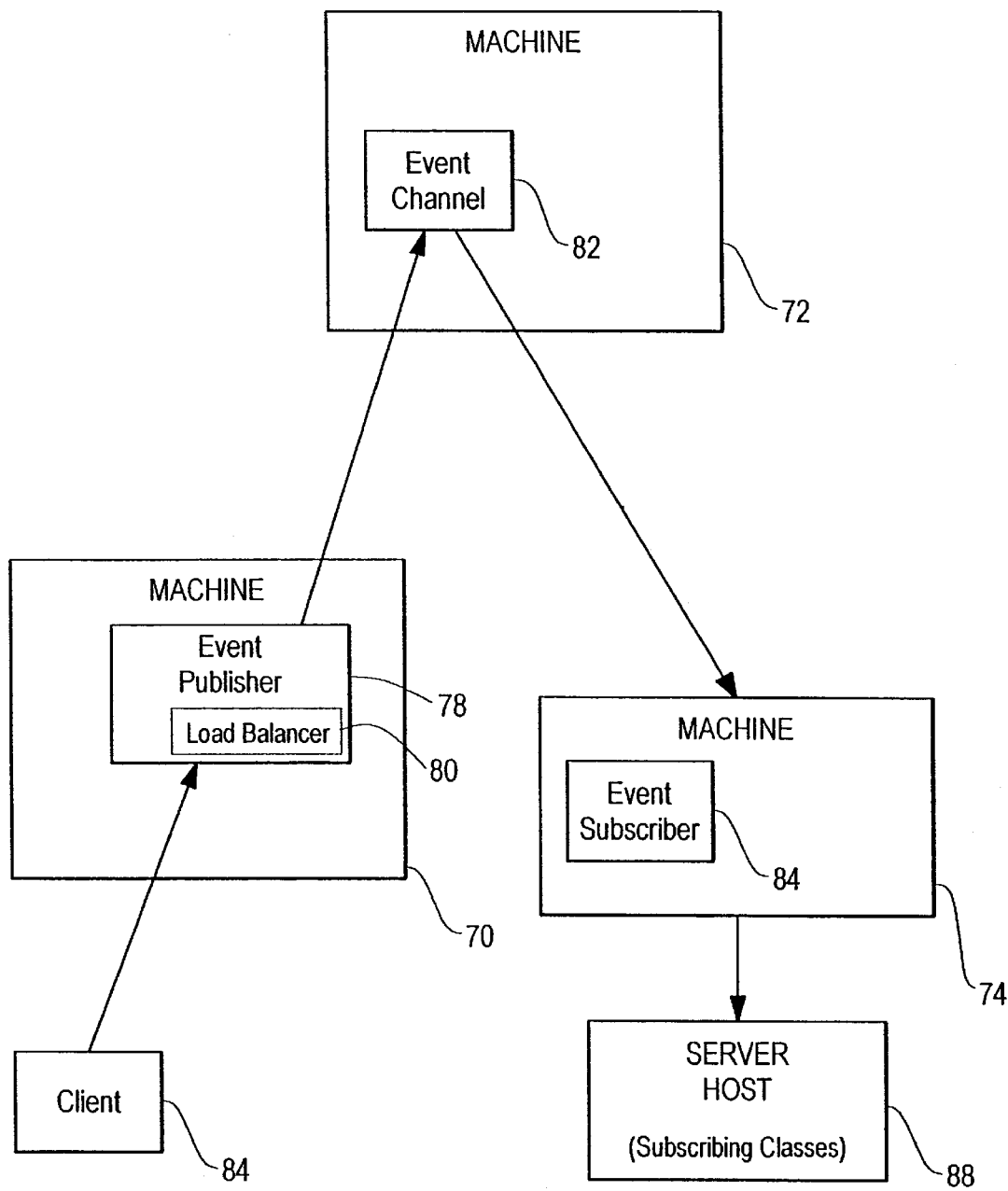
FIG. 4 is an exemplary publish and subscribe model on which the load balancing system of the present invention may be implemented.

In an exemplary system in which the load balancing of the invention can be applied, as shown in FIG. 4, events may be published by a client using event services provided in the system by an Event Publisher, Event Channel, and Event Subscriber which are all objects connected to a communications network.

Event Publisher 78 provides a way for objects to publish events in the object environment. Event Publisher 78 receives events from the publishing object and places them on an appropriate Event Channel 82. Events may conveniently be published as serialized objects. Event Publisher 78 may maintain a list of subscriber classes for specific event types. Lists of this type may be stored in an administrator object and requested by Event Publisher 78 as needed. Having this information, Event Publisher 78 can provide a list of all subscribing classes upon publication of an event.

Event Channel 82 implements an event channel that is similar to channels provided, for example, in the CORBA Event Service. Any number of Event Channels may be provided and Event Channels may be provided on any machine in the distributed object environment and an Event Publisher may locate and communicate with an Event Channel using CORBA services. Event Channel 82 receives an event from the Event Publisher 78 and sends the event on to all Event Subscribers (only one shown). Event Subscribers can be provided for each host machine in the distributed object environment, or they can be distributed throughout the environment in some other fashion where each Event Subscriber 84 is responsible for some portion of the environment.

Event Subscriber 84 provides a way for classes to "register" for specific events. Event Subscriber 84 receives events from the Event Channel 82 and forwards the events to the appropriate classes. On startup, Event Subscriber 84 contacts an administrator object to obtain a list of all classes in its scheme and the location of every Event Channel 82 that is defined in the system. Event Channel 82 calls each Event Subscriber 84 whenever there is an event in the channel to be processed. Event Subscriber 84 parses the event and determines whether the event is subscribed to by an object on its host. If so, Event Subscriber 84 passes the event directly to the subscribing object.

If no subscribing object is instantiated on the desired host, Event Subscriber 84 checks to see whether a subscriber thread pool is running for the subscribing class. If not, Event Subscriber 84 starts a new subscriber thread pool, typically in a new Java virtual machine, and passes the event to the subscriber thread pool. The subscriber thread pool instantiates the subscribing object, such as a server object and passes the event to the instantiated subscribing object. The subscribing object then processes the event. In this way, events can be directed to specific hosts, either for load balancing purposes or because the event has specific processing needs that are met by a specific machine, whether or not the subscribing object is running on that machine.

While providing an Event Subscriber on each server host may be beneficial under some circumstances, consistent with the distributed object architecture described herein, one or more Event Subscribers may be present anywhere within system without regard to the physical structure of the network. That is, the Event Subscriber need not be located on the same machine as the subscribing object, but only needs to be connected to objects running on a server host through an ORB.

For example, when a published event includes load balancing information that specifies a particular server host to process an event, Event Channel 82 sends that event to each Event Subscriber 84 in the system and each Event Subscriber 84 parses the event to determine whether that Event Subscriber is the Event Subscriber 84 that should further process the event. If an Event Subscriber 84 does conclude that it should handle the event, that Event Subscriber 84 passes the event to a subscribing object on the identified host through the ORB. If the subscribing object is not running on that host, Event Subscriber 84 can call a subscriber thread pool on that host to instantiate the subscribing object before passing the event on.

Figure 3:
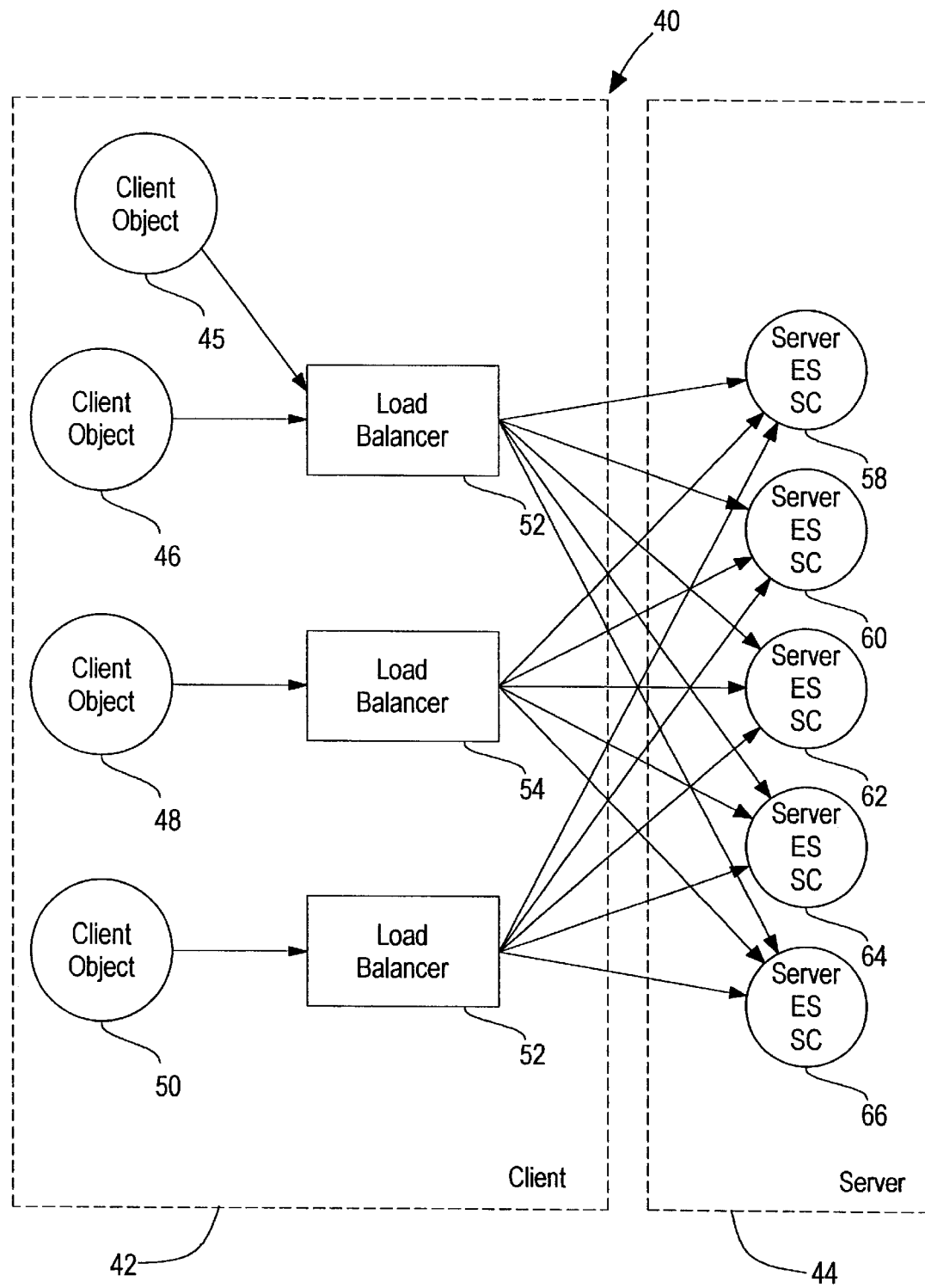
FIG. 3 is a block diagram of a load balancing system in accordance with the teachings of the present invention.

Referring to FIG. 3, an exemplary load balancing system 40 of the invention for use in a networked or distributed object environment is illustrated. In the exemplary embodiment, the system 40 is generally divided into a client side 42 and a server side 44. The load balancing system 40 includes a number of calling or client objects 45, 46, 48 and 50 and a number of load balancer objects 52, 54 and 56 which are contained within the client side 42.

In the present system, the calling or client objects 45, 46, 48 and 50 communicate, respectively, with load balancer objects 52, 54 and 56. Although only four client objects and three load balancer objects are shown, it is contemplated that more or fewer client objects and load balancers may be utilized in accordance with the teachings herein. In an exemplary embodiment, the load balancer objects 52, 54 and 56 are in further communication with receiving or server hosts 58, 60, 62, 64 and 66 which handle events published within the system. In addition, the load balancing objects may be implemented in conjunction with each of a plurality of Event Publisher objects in the system.

As shown in FIG. 3, the load balancing system is operational having an Event Subscriber (ES) and certain subscribing classes (SC) on each respective server host. However, in other embodiments, an Event Subscriber does not have to be present on the server with the subscribing classes. In fact, as described earlier herein, one or more Event Subscribers may be present anywhere within the system without physical regard to the physical structure of the network. Similarly, the certain subscribing classes do not have to exist physically on the server. If the subscribing object is not running on that server, an Event Subscriber can call a subscriber thread pool on that server to instantiate the subscribing object before passing the event on to the server.

In an exemplary embodiment, a load balancer object determines a balanced distribution for events which have been published or initiated by the client. In determining a balanced distribution for the handling of events in the system, the load balancer monitors and obtains a load reading for each host. The load reading is essentially a measurement of how "busy" the host is at the time the reading is taken. Monitoring of the load in the system can be performed intermittently at predetermined intervals of time. For example, in an exemplary embodiment, load monitoring or querying can be performed at intervals of 30 seconds. Clearly, other monitoring intervals are possible in accordance with the requirements of the system. For example, as the number of load balancing objects in a system increases, there is a tendency for a natural randomized distribution of load queries to develop. One load balancer may check for load on the servers every 5 seconds, while another may check every 15 second intervals while the next at 30 second intervals and so on so that various overlapping patterns of load queries are taken at any given point in time.

Furthermore, in operation the load balancer builds a table of the subscribing classes and associated server hosts. The table is constructed using the list of subscribing classes for an event, and the load on the server hosts. Additionally, a predetermined or pre-assigned power rating for each server may be included in the table. The power provides the system with a mechanism to rank hosts in the system for the receipt of a published event. The power rating can be any number and for example, in a system with 10 hosts, the hosts could be numbered sequentially from 1 to 10 with 10 being the highest priority hosts. For example, in a manufacturing context, if a factory had a high-priced machine working in conjunction with a lower cost machine, the host associated with the higher priced machine could be given a power of 10 while the host associated with the lower cost machine could be given a priority of 1. Consequently, the lower cost machine would be engaged only when the higher priced machine had a load which was significantly greater than the load experienced by the lower priced machine, e.g. a load of at least 10 times greater.

Finally, the load balancer table ranks the server hosts based on the load such that the server host with the lowest load will run all subscribing objects for the event. If more than one server has the same load, the servers are prioritized chronologically within the table, e.g. the servers are ranked simply by appearance in the queue. One exception to this is for subscribing objects which have been statically defined to run on one specific host. In specific cases, these subscribing objects may be statically defined to run on a specific server host regardless of the load on that server host because the event has specific processing needs that are met by that specific machine. The Load Balancer can then direct the event to the highest ranking server host having a subscribing class to handle the event, resulting in a balanced distribution of events among the server hosts.

In an exemplary embodiment, the load parameter received from the server host is a value, typically a floating point number which represents the load of the server host at the current reading. In an exemplary embodiment, the load value represents the number of system threads in queue waiting on the server host central processing unit which determines how "busy" that specific server host is at that point in time. The server hosts can then be ranked, for example, by dividing the local parameter by the power rating, with the lowest result being the highest ranked server host.

As shown in FIG. 4, the load balancing system of the present invention may be implemented in a network utilizing a publish-subscribe event protocol as discussed earlier herein. As used herein, the term "network" may be a single computer consisting of multiple processors such as a parallel computer or it can also be a cluster of interconnected computers which are connected or networked together for use in a distributed computing environment, and in particular, a distributed object computing environment. In publish-subscribe communications, objects may publish information or requests of interest and other objects may subscribe to a selected subset of published material or events. Publish-subscribe or event-driven communications provides asynchronous communication among objects, that is, a publishing object need not wait for, or even know about, subscribing objects in order to publish.

A load balancing system of the present invention which implements a publish-subscribe event protocol as described herein is illustrated in FIG. 4. The system includes a plurality of hosts 70, 72, 74 and 88 which communicate with one another using this protocol. Although, only five hosts are shown, the number or location or type of hosts are not particularly limited. Each of these hosts is connected by a communications network 86 which may be an ORB.

An exemplary system which implements the method and apparatus of the present invention uses a number of system objects including an Event Publisher 78 which is used to manage the publishing of events from a single host as illustrated or alternatively from any number of hosts on the network. An Event Channel 82 is used to manage the distribution of events and an Event Subscriber 84 is used to manage the mapping of events to classes on a single server host or group of server hosts.

In an exemplary embodiment as shown in FIG. 4, an event is first initiated by a client 76, possibly by user interaction with a GUI. The event is passed to the Event Publisher 78 on a first host 70 (via an ORB). Concurrently, a number of other users may be simultaneously interacting with the system through alternate GUIs. Multiple GUIs can communicate with a single Event Publisher or in the case of a distributed system, potentially multiple Event Publishers.

Once the event has been initiated by the client, the Event Publisher 78, by means of a load balancing object 80 in communication with Event Publisher 78, adds load balancing information into the event. That is, Event Publisher 78 maintains a list of which machines can run classes that subscribe to an event while load balancer 80 may query the system for particular server hosts such as host 88 in FIG. 4 or hosts 94, 96, and 98 in FIG. 5 that have a low load and Event Publisher 78 can include information relating to that low load host or subscriber in the event in order to direct the event to the lowest load host capable of handling the object. In this way, events can be directed to specific hosts, either for load balancing purposes or because the event has specific processing needs that are met by a specific machine. Also, where subscriber thread pools are employed as described above, the event can be directed to the lowest load server host having a subscribing class, whether or not the subscribing object is actually running on that host.

Figure 5:
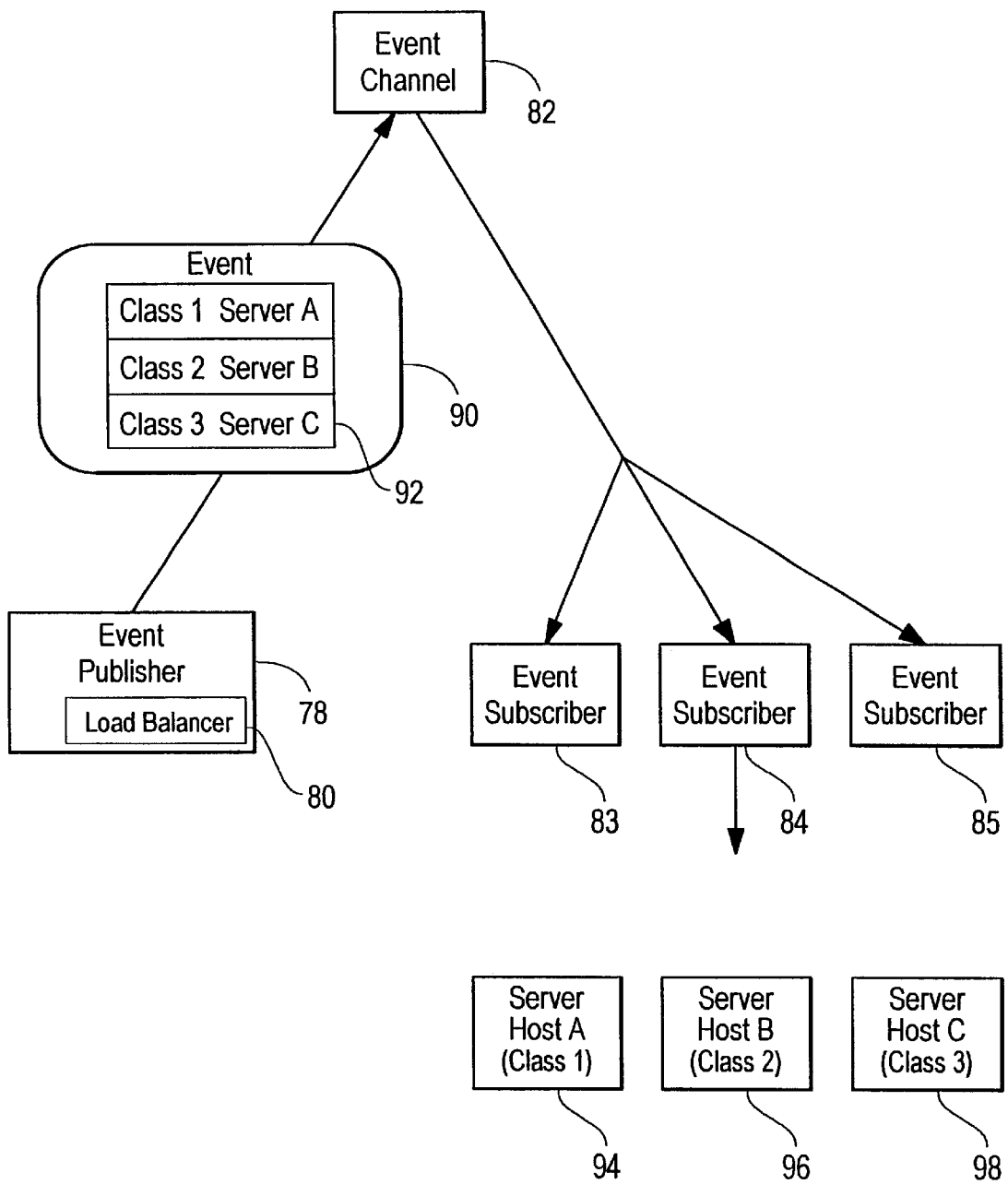
FIG. 5 is an exemplary publish and subscribe model showing the contents of an event which has been published.

Referring to FIG. 5, the published event 90 includes load balancing information in a table 92, as described earlier herein, that specifies at least one particular server host to process the class or classes contained in the event. In an exemplary embodiment, the Event Publisher 78 contains a list of subscribing classes for the event and uses this in conjunction with the load balancer 80 to determine which server host should handle the event for each subscribing class. Preferably, the server hosts with the lowest relative load will be prioritized to handle the event. However, in specific situations, certain server hosts may be pre-defined to process certain events regardless of the load on that server host. For example, certain server hosts may be associated with specific task machinery and thus events relating to those specific tasks would only be appropriately handled by that certain server host. In this example, three classes subscribe to the published event and, based on load balancing information, Event Publisher 78 associates Subscribing Class 1 with Server Host A, Subscribing Class 2, Server Host B and Subscribing Class 3, with Server Host C.

Event Channel 82 then sends the event to each Event Subscriber 83, 84 and 85 in the system and each Event Subscriber parses the table coupled in the event to determine whether that particular Event Subscriber is the Event Subscriber that should further process the event. If the Event Subscriber 84 does conclude that it should handle the event by looking for the server host name in the table, that Event Subscriber passes the event to a subscribing object on the identified server host directly if the Event Subscriber and subscribing object are on the same machine, or through the ORB. If the subscribing object is not running on that server host, Event Subscriber 84 can call a subscriber thread pool, not shown, on that server host, to instantiate the subscribing object before passing the event on.

An exemplary usage of the present invention in conjunction with an manufacturing execution system will now be described. The following example will be described with respect to an employee database system where a user desires to delete a certain manufacturing employee record. The user or system administrator will through a specially designed GUI interface select a function, in this case, a "DELETE" button or key. Activating the delete key effectively publishes, through a publishing object, a "delete employee event" on the system. The system obtains a list of active subscribers or subscribing classes for the "delete employee event". The load on each host is determined and may be combined with a user defined power rating to determine which host should handle the event. Only an object belonging to the subscribing classes may process the event, in this case, the specific employee is deleted. In one embodiment, the processing object then may also return a confirmation to the publishing object as to whether the deletion was successful or unsuccessful.

As indicated heretofore, aspects of this invention pertain to specific methods and method functions implementable on computer systems. Those of ordinary skill in the art should readily appreciate that computer code defining these functions can be delivered to a computer in many forms; including, but not limited to: (a) information stored on non-writable storage media (e.g., read only memory devices within a computer or CD-ROM disks readable by a computer I/O attachment); (b) information stored on writable storage media (e.g., floppy disks and hard drives); or (c) information conveyed to a computer through communication media such as telephone networks. It should be understood, therefore, that such media, when carrying such information, represent alternate embodiments of the present invention.

It will be understood that the foregoing is only illustrative of the principles of the invention, and that various modifications can be made by those skilled in the art without departing from the scope and spirit of the invention.

What is claimed is:

1. A system for balancing the distribution of event messages in a distributed object computing environment having at least one client publishing an event containing information and a plurality of server classes residing on a plurality of server hosts, at least one server class subscribing to the event published by the client, a plurality of event subscriber objects each being affiliated with a server host, and a plurality of load balancers, each load balancer querying the plurality of server hosts to calculate a load parameter for each server host, the system performing the steps of:

a) registering at least one server class as a subscriber for selected events;

b) for each subscribing server class, registering one or more server hosts as capable of running an instance of the subscribing server class;

c) publishing the event by the client;

d) reception of the event by at least one of the plurality of load balancers;

e) selection and identification of a server host for each subscribing server class registered to subscribe to the event by the load balancer receiving the event based on load parameters calculated and the server hosts registered capable of running an instance of the subscribing server class;

f) coupling the selected server host identity for each subscribing server class to the event and further publication of the event into the distributed object computing environment by the load balancer receiving the event;

g) reception of the event by each event subscriber object, each event subscriber object reviewing the selected server host identity information, if the selected server host affiliated with at least one event subscriber object, the event subscriber object passing the event onto the selected server host for processing; and h) performance of logical operations by at least one instance of each subscribing server class for the published event as designated by the selected server host identity information coupled to the event, and not by instances on other server hosts.

2. The system of claim 1, wherein publishing an event includes passing the event to the event publisher for further publication into an event channel, wherein the event channel passes the event to the plurality of event subscriber objects.

3. The system of claim 1, wherein the load parameters calculated from the plurality of selected server hosts includes a value representing a number of system threads in queue waiting on a central processing unit on the server host and a power rating which has been pre-assigned to the plurality of server hosts.

4. The system of claim 1, wherein the event subscriber instantiates an object of a subscribing server class on the selected server host identified in the event for the subscribing server class in the event that no such object is instantiated on the selected server host when the event subscriber receives the event.

5. The system of claim 1, wherein the plurality of load balancers query the plurality of server hosts at randomized time intervals.

6. The system of claim 1, wherein the selected server host identity and subscribing server class are coupled in a table within the published event.

7. In a system for balancing the distribution of event messages in a distributed object computing environment having at least one client publishing an event containing information and a plurality of server classes residing on a plurality of server hosts, at least one server class subscribing to the event published by the client, a plurality of event subscriber objects each being affiliated with a server host, and a plurality of load balancers, each load balancer querying the plurality of server hosts to calculate a load parameter for each server host, a computer program product comprising a computer useable medium having computer readable program code to direct the system to perform at least the following steps:

a) registering at least one server class as a subscriber for selected events;

b) for each subscribing server class, registering one or more server hosts as capable of running an instance of the subscribing server class;

c) publishing the event by the client;

d) reception of the event by at least one of the plurality of load balancers;

e) selection and identification of a server host for each subscribing server class registered to subscribe to the event by the load balancer receiving the event based on load parameters calculated and the server hosts registered capable of running an instance of the subscribing server class;

f) coupling the selected server host identity for each subscribing server class to the event and further publication of the event into the distributed object computing environment by the load balancer receiving the event;

g) reception of the event by each event subscriber object, each event subscriber object reviewing the selected server host identity information, if the selected server host affiliated with at least one event subscriber object, the event subscriber object passing the event onto the selected server host for processing; and h) performance of logical operations by at least one instance of each subscribing server class for the published event as designated by the selected server host identity information coupled to the event, and not by instances on other server hosts.

8. The computer program product of claim 7, wherein publishing the event includes passing the event to an event publisher for further publication into an event channel, wherein the event channel passes the event to the plurality of event subscribers.

9. The computer program product of claim 7, wherein the event subscriber object instantiates an object of a subscribing server class on the selected server host identified in the event for the subscribing server class in the event that no such object is instantiated on the selected server host when the event subscriber object receives the event.

10. A method for balancing the distribution of event messages in a distributed object computing environment having at least one client publishing an event containing information and a plurality of subscribing server objects instantiated from a single server class residing on a plurality of server hosts, and a plurality of load balancers, each load balancer querying the plurality of server hosts to identify a load parameter for each server host, comprising the steps of:

a) publishing the event by the client;

b) reception of the event by at least one of the plurality of load balancers;

c) selection and identification of a server host having at least one subscribing server object by the load balancer receiving the event based on load parameters collected;

d) coupling of the selected server host identity to the event and further publication of the event into the distributed object computing environment by the load balancer receiving the event;

e) reception of the event by the plurality of subscribing server objects; and f) performance of logical operations by a subscribing server object on the identified server host and not by a subscribing server object on any other server host based on information provided in the event.

11. The method of claim 10, wherein publishing the event includes passing the event to an event publisher for further publication into an event channel.

12. The method of claim 11, wherein the event channel passes the event to a plurality of event subscribers, wherein for each event published, at least one event subscriber passes the event to the subscribing server object on the identified server host.

13. The method of claim 10, wherein at least one of the load parameters collected from the plurality of server hosts include a value representing a number of system threads in queue waiting on a central processing unit on the selected server host.

14. The method of claim 13, further comprising the step of:

g) assigning to the plurality of server hosts a power rating, wherein the power rating is combined with the other load parameters to determine which of the plurality of server hosts having at least one subscribing object thereon should receive the event.

15. The method of claim 10, wherein the distributed object computing environment is a distributed manufacturing execution system environment and the at least one client inputs information to the manufacturing execution system from a manufacturing floor.

16. The method of claim 10, wherein the plurality of load balancers query the plurality of server hosts for the load parameter at predetermined overlapping time intervals wherein as the number of load balancers in the distributed object computing environment increases, the queries become randomized.

* * * * *